(12) United States Patent
Lucas

(10) Patent No.: US 8,087,642 B2
(45) Date of Patent: Jan. 3, 2012

(54) GAS INJECTION VALVE WITH TWO POSITIONS OF CLOSURE

(75) Inventor: Sandra Lucas, Pontarlier (FR)

(73) Assignee: Schrader SAS, Pontarlier (FR)

( * ) Notice: Subject to any disclaimer, the term of this patent is extended or adjusted under 35 U.S.C. 154(b) by 540 days.

(21) Appl. No.: 12/160,810

(22) PCT Filed: Jan. 11, 2007

(86) PCT No.: PCT/EP2007/000379

§ 371 (c)(1),
(2), (4) Date: Jul. 14, 2008

(87) PCT Pub. No.: WO2007/082729

PCT Pub. Date: Jul. 26, 2007

(65) Prior Publication Data

US 2010/0038573 A1    Feb. 18, 2010

(30) Foreign Application Priority Data

Jan. 17, 2006    (FR) ..................................... 06 00410

(51) Int. Cl.
*F16K 15/00*    (2006.01)
(52) U.S. Cl. ..................................... 251/334; 251/149.1
(58) Field of Classification Search .............. 251/149.1, 251/149.6, 333, 334
See application file for complete search history.

(56) References Cited

U.S. PATENT DOCUMENTS

| | | |
|---|---|---|
| 2,307,546 A | 1/1943 | Shimer |
| 2,485,092 A | 10/1949 | Gannon |
| 2,490,511 A | 12/1949 | Courtot |
| 3,057,372 A | 10/1962 | Sutton et al. |
| 3,085,783 A | 4/1963 | Pulling |
| 3,272,218 A | 9/1966 | Johnson |
| 4,518,329 A | 5/1985 | Weaver |
| 4,781,213 A | 11/1988 | Kilayko |
| 6,050,295 A | 4/2000 | Meisinger |
| 6,237,631 B1 * | 5/2001 | Giesler et al. ............ 137/614.04 |
| 6,637,726 B1 | 10/2003 | Yamamoto |
| 6,659,426 B2 * | 12/2003 | Schroeder et al. ......... 251/149.6 |
| 6,719,003 B2 * | 4/2004 | Schroeder et al. ............ 137/322 |
| 6,776,360 B2 | 8/2004 | Haruch |
| 2003/0116740 A1 | 6/2003 | Schroeder |
| 2005/0126638 A1 | 6/2005 | Gilbert |

FOREIGN PATENT DOCUMENTS

| | | |
|---|---|---|
| DE | 1121419 B | 1/1962 |
| FR | 1351077 A | 1/1964 |

OTHER PUBLICATIONS

ISR in priority document PCT/EP2007/000379.

* cited by examiner

*Primary Examiner* — John Fristoe, Jr.
(74) *Attorney, Agent, or Firm* — Bachman & LaPointe, P.C.

(57) ABSTRACT

Charge valve for gas, in particular for carbon dioxide, comprising a seat, drilled with a passage, a shaft movable inside the passage against the compression of a return spring bearing against the seat and an elastomeric seal compressed between the seat and the shaft to close the passage when the shaft is moved into a first closed position, called low-pressure position, wherein a thermoplastic seal comprising a polymer that is deformable but has a hardness higher than that of the elastomeric seal, is added onto the seat or onto the shaft to close the passage when the thermoplastic seal is compressed between the seat and the shaft in a second closed position, called high-pressure position, against an additional compression of the elastomeric seal.

5 Claims, 9 Drawing Sheets

GAS INJECTION VALVE WITH TWO POSITIONS OF CLOSURE

BACKGROUND

(1) Field of the Invention

The invention relates to a charge valve for gas, in particular for carbon dioxide, comprising more particularly a seat drilled with a passage, a shaft movable inside the passage against the compression of a return spring bearing against the seat and an elastomeric seal compressed between the seat and the shaft to close the passage when the shaft is moved into a first closed position, called low-pressure position.

(2) Prior Art

Such a charge valve is known from document U.S. Pat. No. 6,637,726 relating to an air conditioning system using carbon dioxide $CO_2$.

In the low-pressure closed position, that is for gas pressures up to 60 bar, the elastomeric seal is sufficient to tightly close the passage. However, the force on the shaft increases with an increase in the gas pressure, which may be up to 200 bar. This causes a progressive decrease in the sealing of the closure of the passage, the elastomeric seal becoming increasingly permeable, particularly at high temperatures, for example up to 180 degrees Celsius (° C.).

SUMMARY OF THE INVENTION

It is the object of the invention to modify a charge valve of the type described above to guarantee a leak-free closure of the passage, not only at low pressure but also at high pressure.

For this purpose, the invention relates to a charge valve for gas, in particular for carbon dioxide, comprising a seat drilled with a passage, a shaft movable inside the passage against the compression of a return spring bearing against the seat and an elastomeric seal compressed between the seat and the shaft to close the passage when the shaft is moved into a first closed position, called low-pressure position, characterized in that a thermoplastic seal comprising a polymer that is deformable but has a hardness higher than that of the elastomeric seal, is added onto the seat or onto the shaft to close the passage when the thermoplastic seal is compressed between the seat and the shaft in a second closed position, called high-pressure position, against an additional compression of the elastomeric seal.

Under the effect of an increase in the gas pressure applied to the shaft, the thermoplastic seal is progressively compressed between the metal seat and metal shaft. This causes deformation of the thermoplastic seal which provides a leak-free contact both with the seat and with the shaft. This arrangement guarantees a leak-free closure of the passage in the high-pressure closed position. Since the deformation of the thermoplastic seal is lower than the deformation of the elastomeric seal, the former advantageously serves to limit the additional compression of the latter, thereby avoiding a detrimental crushing.

Preferably, the thermoplastic seal is a polyetheretherketone seal to advantageously preserve good mechanical strength in a temperature range up to 250° C.

When the elastomeric seal is in contact with a gas medium formed of very small molecules, such as those of carbon dioxide, the latter will migrate into the material of the elastomeric seal and cause it to swell. This swelling incurs a risk of movement of the elastomeric seal out of its recess between the seat and the shaft, or a risk of tearing if it is mounted too tightly in its recess. The swelling of the elastomeric seal may even incur a risk of dislodging the thermoplastic seal added onto the seat or onto the shaft. This could result in deterioration of the sealing, both at the elastomeric seal and at the thermoplastic seal.

Another situation is liable to occur at the time of opening of the mechanism when the container is under pressure. In fact, the negative pressure that occurs when the mechanism is opened can also cause the elastomeric seal to move outside its reserved space.

To contend with these risks, the thermoplastic seal added onto the seat or onto the shaft is provided with projecting retaining means for retaining the elastomeric seal compressed between the seat and the shaft while arranging an interstice between the thermoplastic seal and the elastomeric seal, enabling the latter to swell in the presence of the gas.

Thanks to these retaining means, the elastomeric seal is securely held when compressed between the seat and the shaft, the projection of these means creating a free volume or interstice between the elastomeric seal and the thermoplastic seal which can advantageously be exploited during the swelling of the elastomeric seal in the presence of gas, in particular of carbon dioxide.

BRIEF DESCRIPTION OF THE DRAWINGS

Other advantages of the invention will appear from a reading of the description of four embodiments illustrated by the drawings.

FIG. 4b is an enlargement of FIG. 4a.

DETAILED DESCRIPTION OF THE PREFERRED EMBODIMENT(S)

Figure 1A:
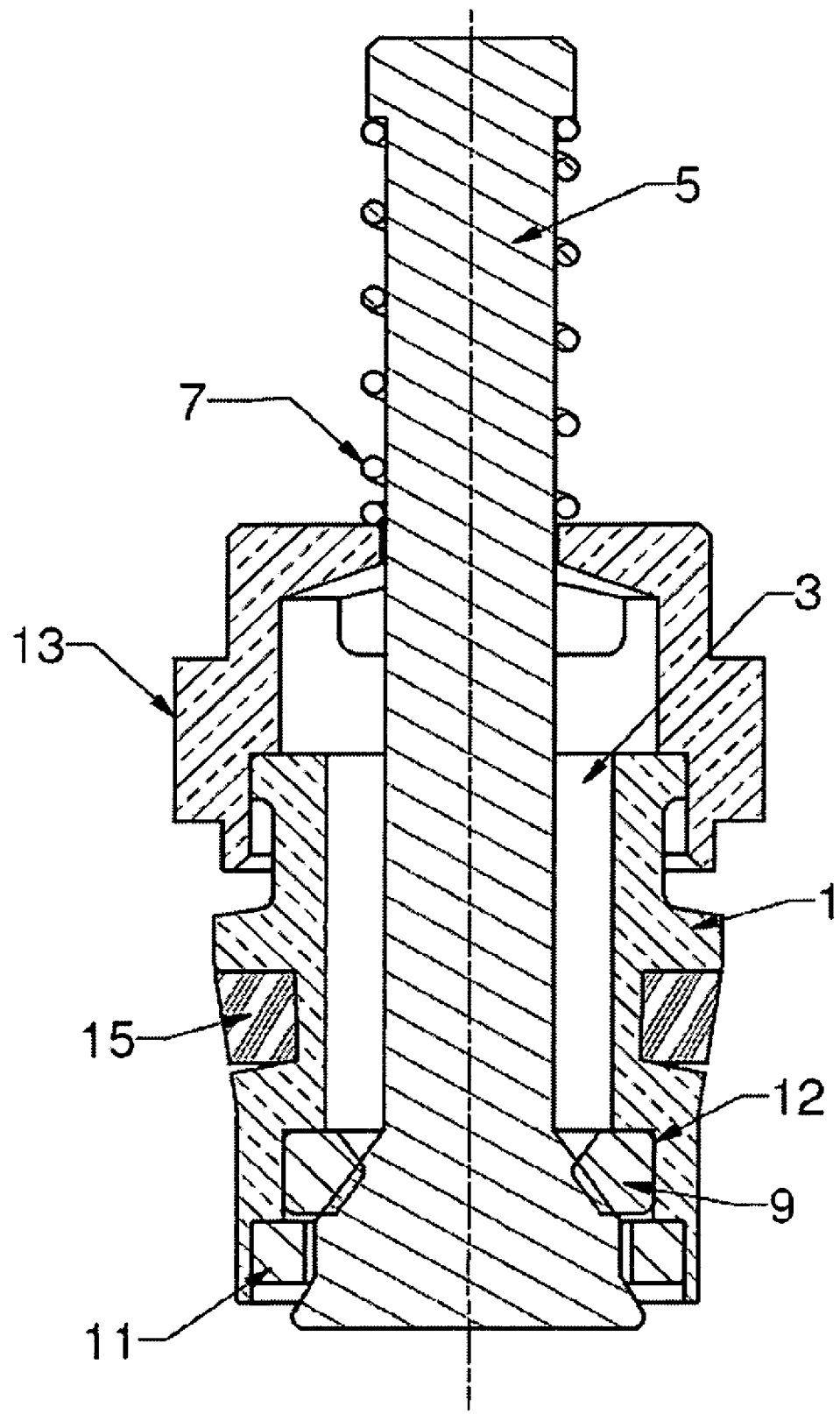
FIGS. 1a and 1b show a section of a gas charge valve according to a first embodiment of the invention, in the low-pressure and high-pressure closed positions respectively, and in which the elastomeric seal is joined to the seat.
Figure 1B:
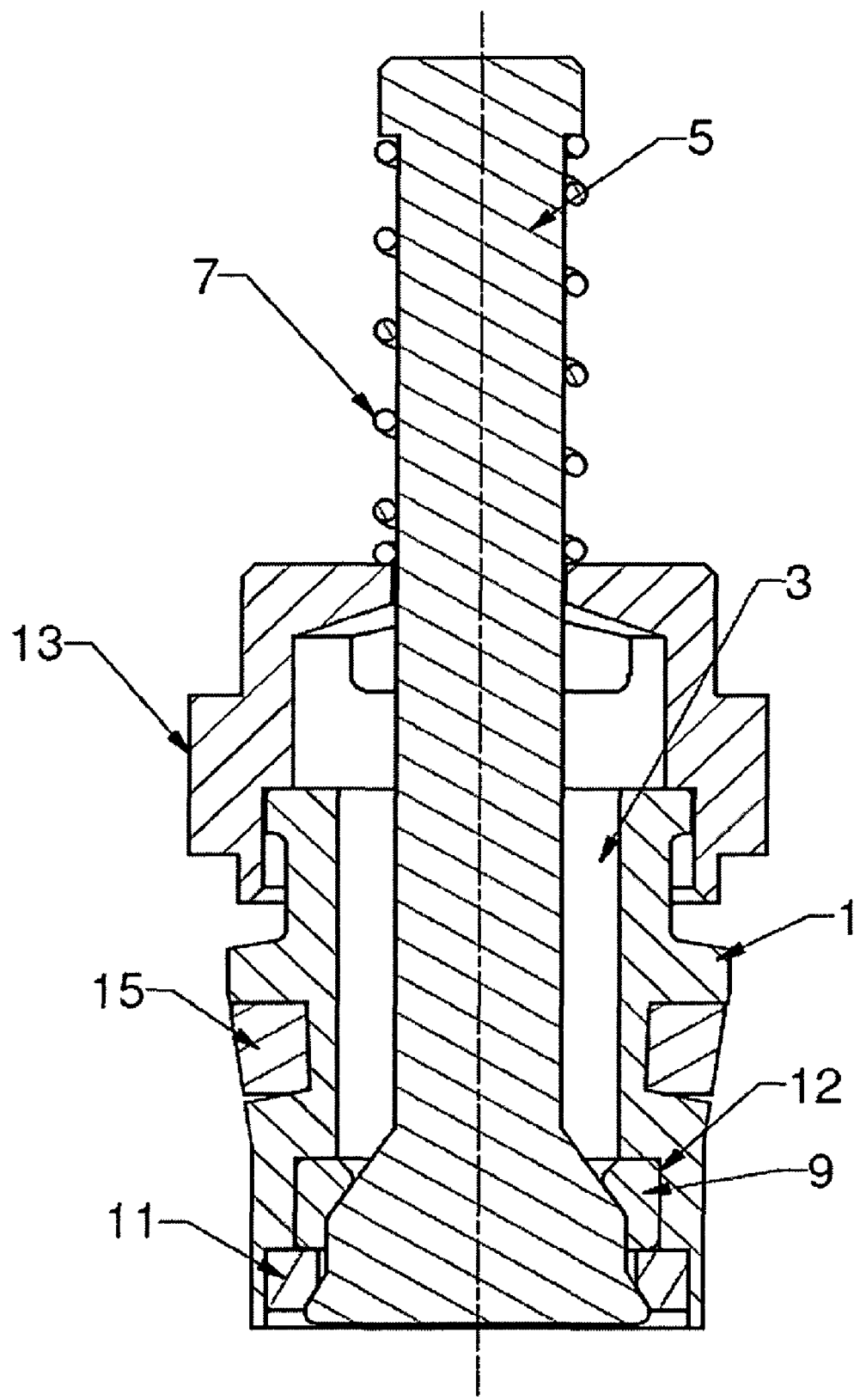

With reference to FIGS. 1a and 1, a gas charge valve comprises a seat 1 drilled with a passage 3, and a shaft 5 movable inside the passage 3 against the compression of a return spring 7 bearing against the seat 1. The shaft 5 is moved from an open position to a first closed position, called low-pressure position, of the passage 3, where an elastomeric seal 9 is separated respectively from the shaft in order to release its passage, or compressed in leak-free contact between the shaft 5 and the seat 1 to obstruct said passage.

The mechanism is intended to be mounted in a valve body, not shown in the figures, being for example threaded thereon via a thread 13 formed on the seat 1. A second elastomeric seal 15 provides the sealing between the seat and the valve body.

The compression of the second elastomeric seal 15 is determined by the clamping force of the thread 13 in the valve body. The valve body is then mounted on the wall of a given system, for example a nozzle forming part of a carbon dioxide $CO_2$ air conditioning system.

The pressure obtaining in the nozzle filled with carbon dioxide is liable to vary from low to high pressure, typically from 0 to 160 bar, particularly under the effect of an increase in temperature.

According to the invention, the thermoplastic seal 11 is added onto the seat 1 or onto the shaft 5 to close the passage 3 when the thermoplastic seal 11 is compressed between the seat 1 and the shaft 5 in a second closed position, called high-pressure position, against an additional compression of the elastomeric seal 9.

In FIGS. 1a-1b and 2a-2c, the thermoplastic seal 11 is joined to the seat 1 in a recess 12.

In FIGS. 3a-3c and 4a-4b, the thermoplastic seal 11 is added onto one of the ends of the shaft 5 having passed around a restriction 14 of the shaft 5.

The thermoplastic seal 11 is deformed under compression between the seat 1 and the shaft 3 to come into leak-free contact in the second closed position of the passage 3, called high-pressure closed position. The second closed position is reached when the shaft 5 is moved from the first closed position, called low-pressure position against the additional compression of the elastomeric seal 9.

Figure 2A:
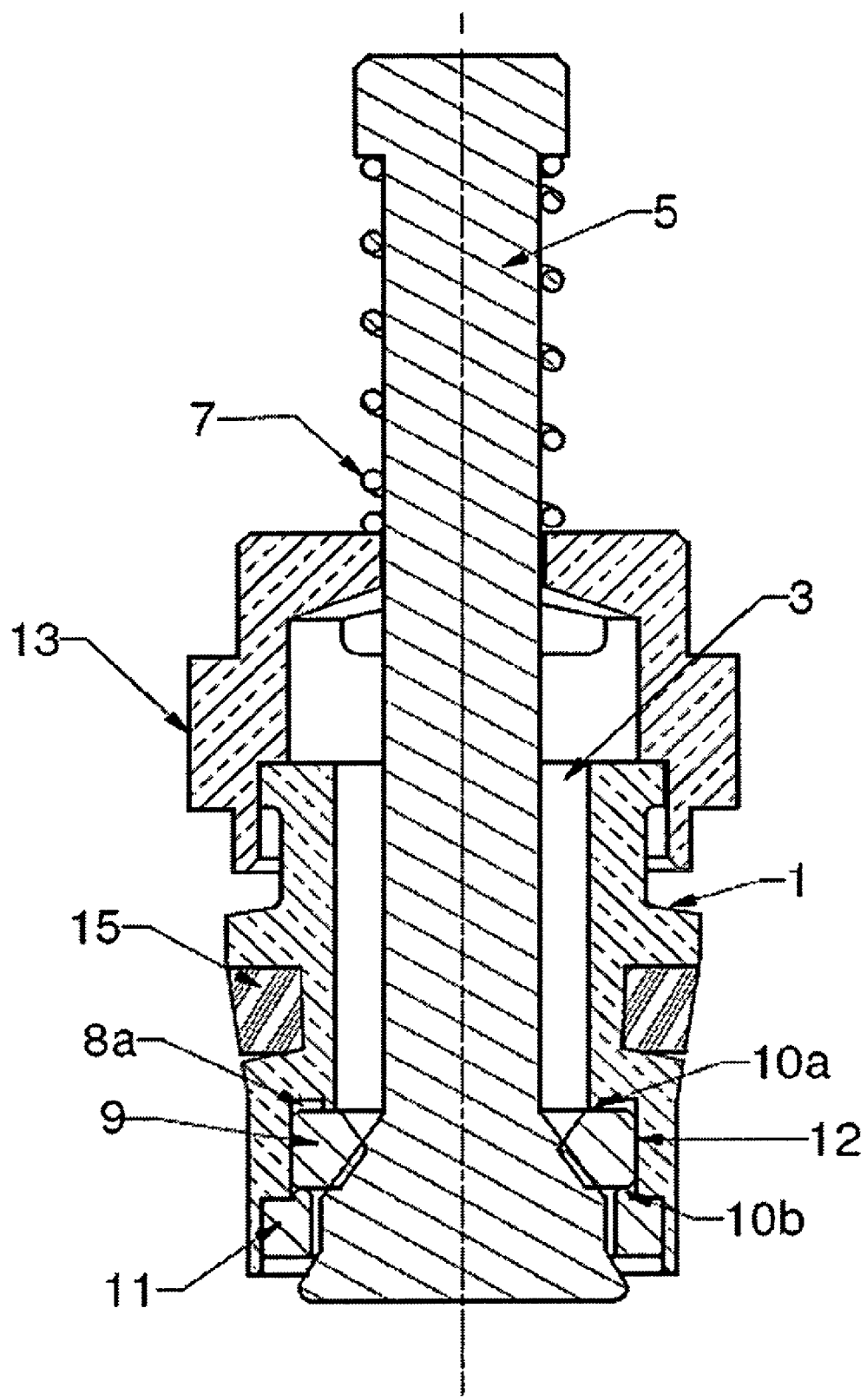
FIGS. 2a and 2b show a section of a gas charge valve according to a second embodiment of the invention, in the low-pressure and high-pressure closed positions respectively, and in which the elastomeric seal is joined to the seat and held by projecting retaining means formed on the thermoplastic seal and on the seat.
Figure 2B:
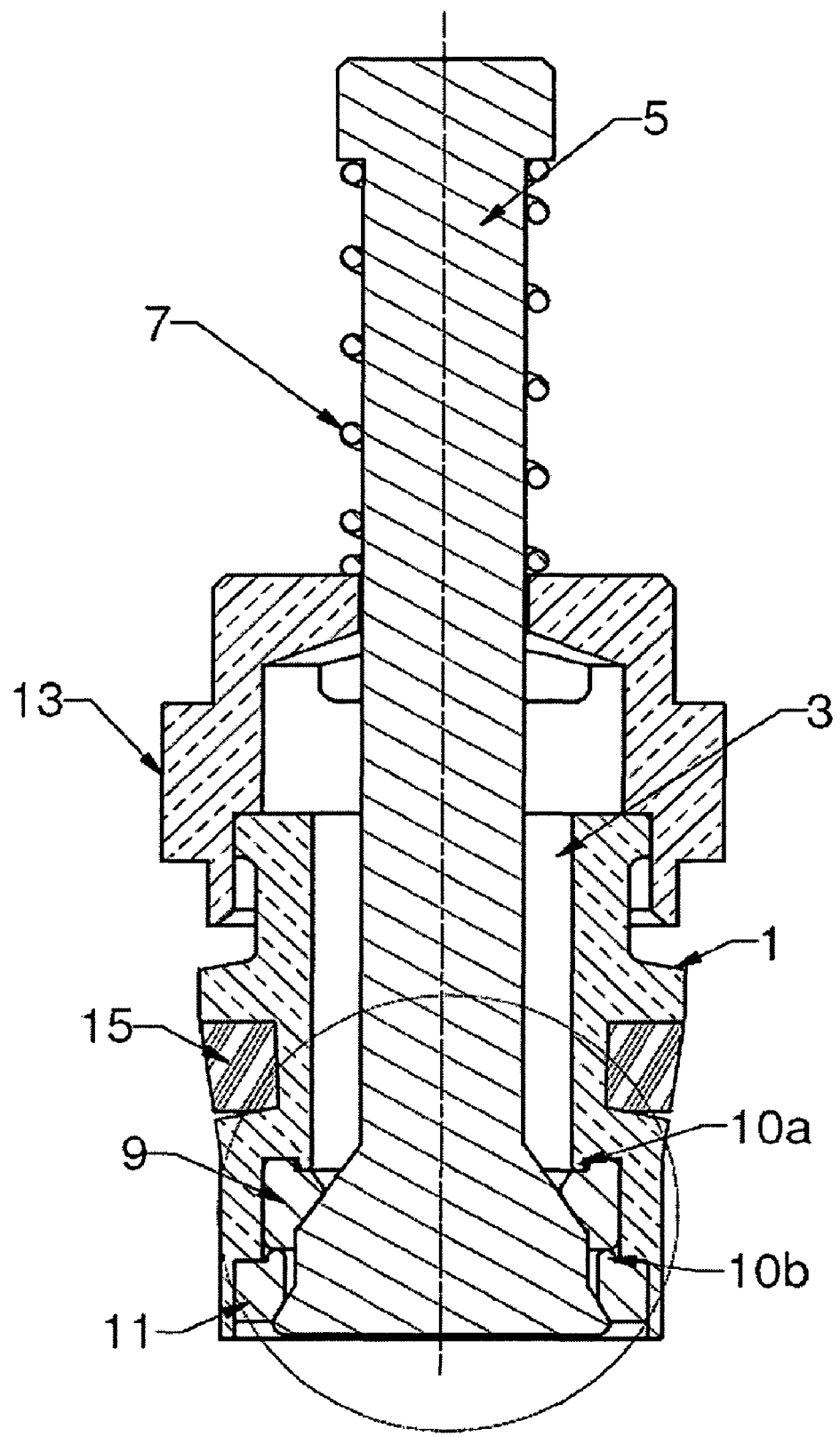
Figure 2C:
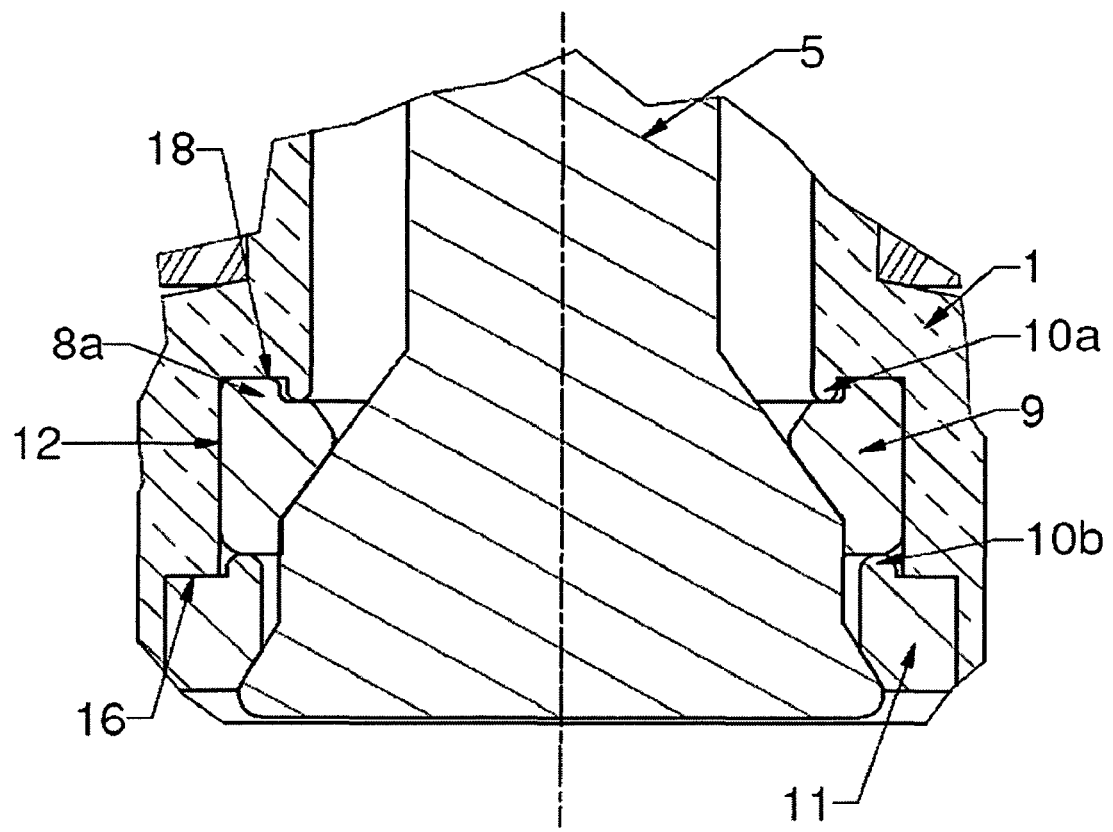
FIG. 2c is an enlargement of FIG. 2b.
Figure 3A:
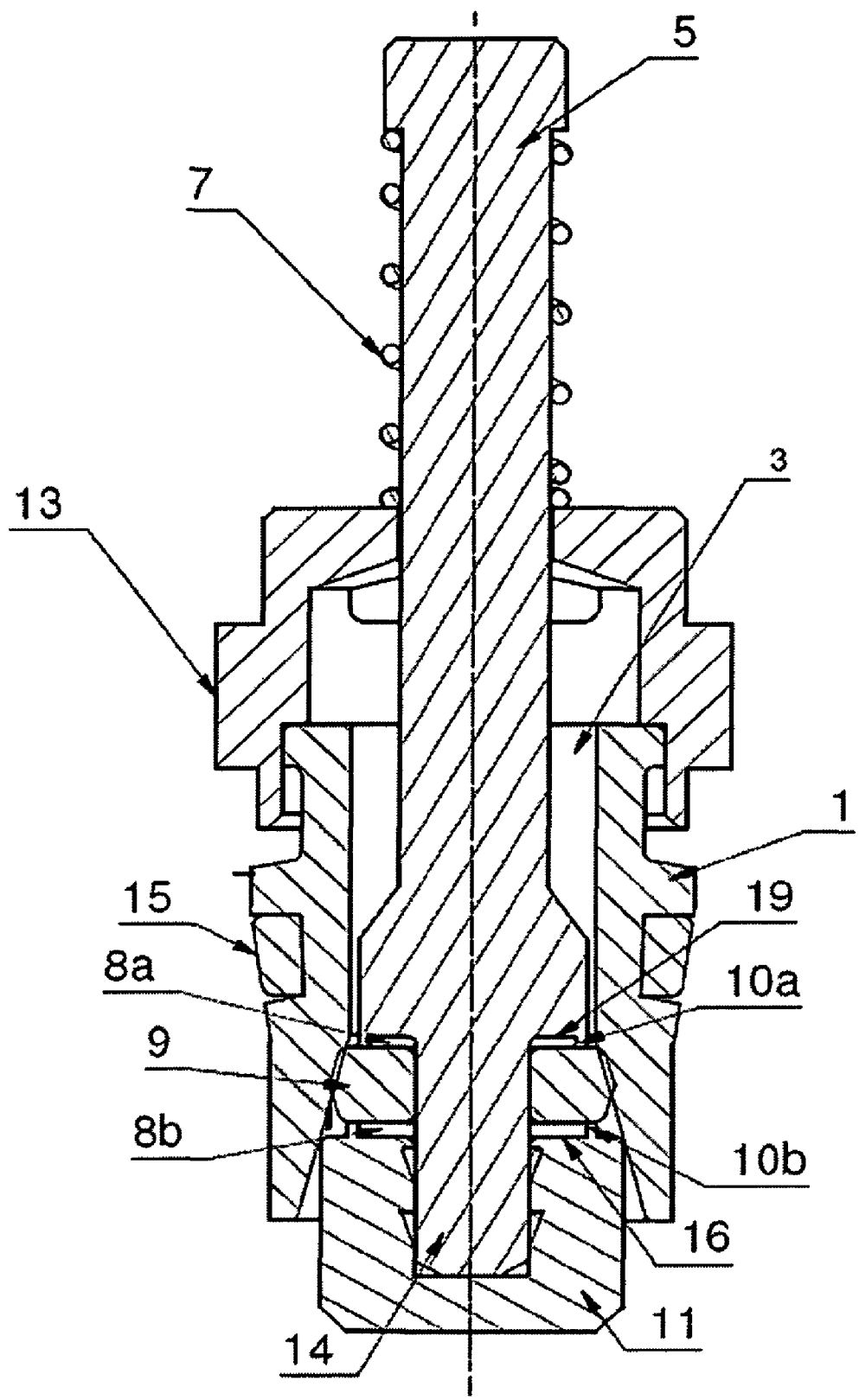
FIGS. 3a and 3b show a section of a gas charge valve according to a third embodiment of the invention, in the low-pressure and high-pressure closed positions respectively, and in which the elastomeric seal is joined to the shaft and held by projecting retaining means formed on the thermoplastic seal and on the shaft.
Figure 3B:
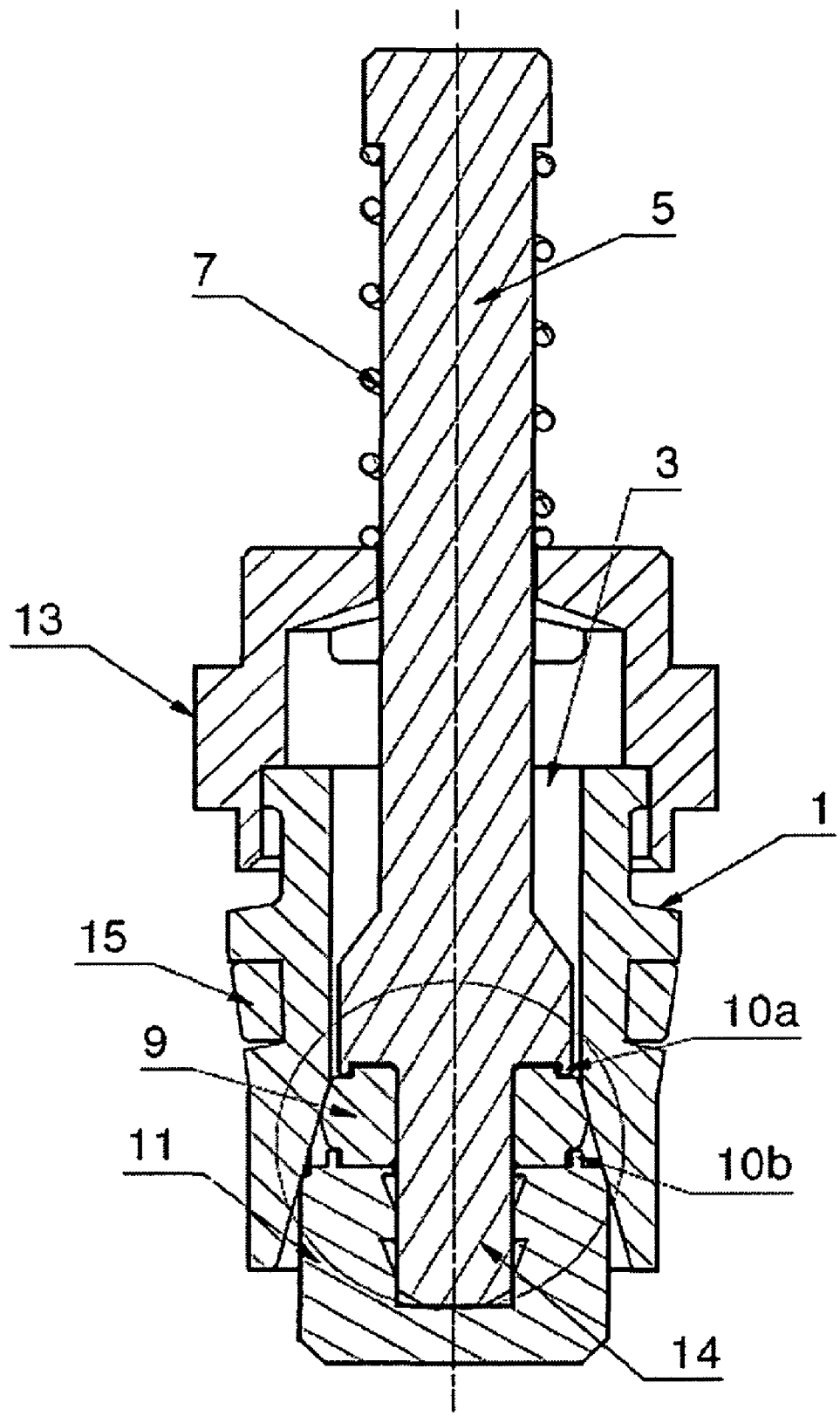
Figure 3C:
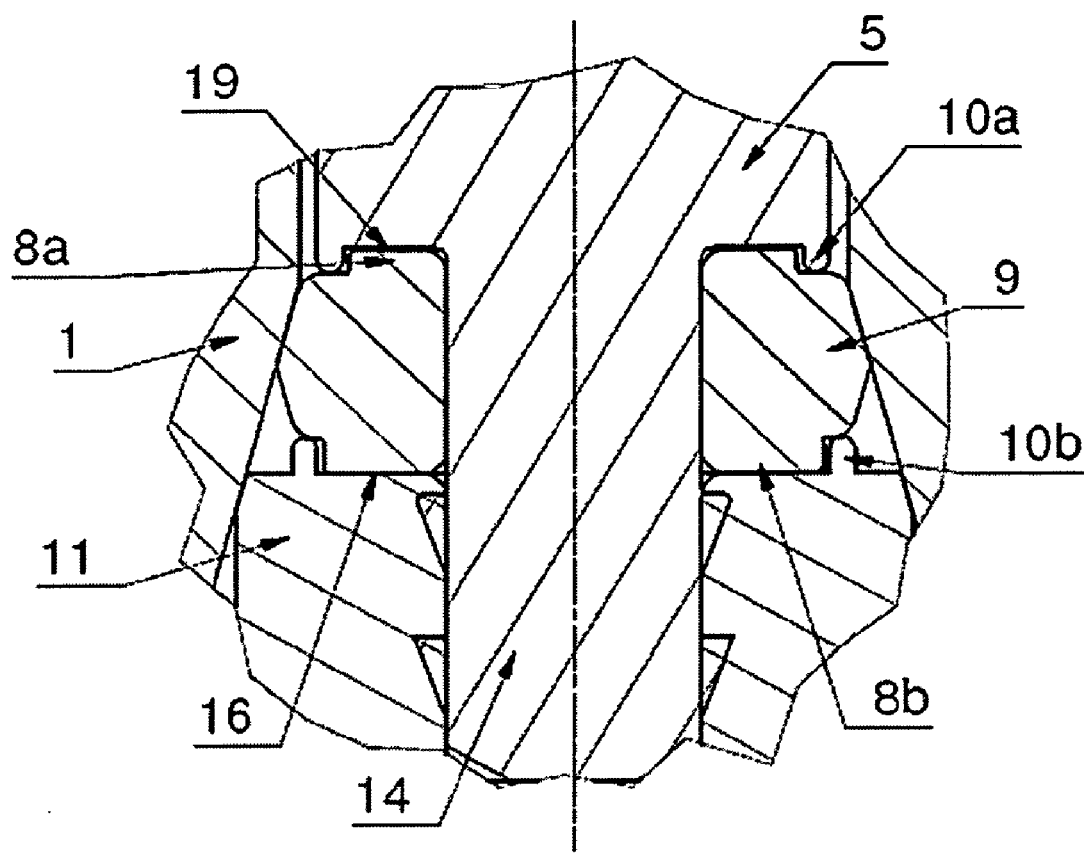
FIG. 3c is an enlargement of FIG. 3b.

The deformation of the thermoplastic seal 11 is more particularly illustrated in the enlarged FIGS. 2c and 3c. Tests performed with a thermoplastic seal made from polyetheretherketone without glass fiber fillers show that the gas charge valve, for example with carbon dioxide, is leak-free with a leakage rate of less than one gram per year for a gas pressure up to 130 bar with a temperature of 130° C. Under the same experimental conditions, if the ring forming the thermoplastic seal 11 is made from a metal alloy, for example the same alloy as that of the seat and of the shaft, the sealing of the gas charge valve thus obtained drops to a leakage rate of 5 grams per year, or even more. This demonstrates that the thermoplastic seal 11 of a gas charge valve according to the invention serves as a leak-free seal and not only as a simple mechanical stop limiting the additional compression of the elastomeric seal.

With reference to FIGS. 2a and 2c, they show a second embodiment of the present invention in which the elastomeric seal 9 is held by retaining means 10a and 10b. As shown more clearly in FIG. 2c, which shows an enlarged detail of FIG. 2b, these retaining means consist of a ring, in this case, an upper ring 10a formed projectingly on one face 18 of the recess 12 of the seat 1 and a lower ring 10b formed projectingly on one face 16 of the thermoplastic seal 11. This arrangement creates an interstice 8a between the elastomeric seal 9 and the seat 1 which enables the elastomeric seal 9 to swell without applying to the thermoplastic seal 11 a pressure that is liable to decrease the sealing in the high-pressure closed position.

According to the two above-mentioned embodiments, corresponding to FIGS. 1a-1b and 2a-2b, the seat 1 has a recess 12 forming a staged double shoulder 22, 23, having different diameters, in which the two seals 9, 11, which have different hardnesses, are separately lodged.

According to the third embodiment shown in FIGS. 3a to 3c, the elastomeric seal 9 is held by retaining rings 10a and 10b formed projecting respectively on one face 19 of the shaft 5 and on the face 16 of the thermoplastic seal 11. This arrangement creates an interstice 8a between the elastomeric seal 9 and the shaft 5 and an interstice 8b between the elastomeric seal 9 and the thermoplastic seal 11. These two interstices 8a and 8b enable the elastomeric seal 9 to swell without applying a pressure to the thermoplastic seal 11 that would be liable to decrease the sealing in the high-pressure closed position, or even to dislodge it from the shaft 5. Such a swelling of the elastomeric seal is caused by the migration of the carbon dioxide into the elastomeric seal and by the increase in temperature during the use of the gas charge valve.

In other words, the interstices 8a and 8b form a free volume or space not occupied by the elastomeric seal 9 when the latter is not yet compressed or inflated by the gas. Thanks to this space, a swelling of the elastomeric seal 9 in the cavity created by the interstices 8a and 8b is feasible during the operation of the valve with no risk of tearing the elastomeric seal or dislodging the thermoplastic seal 11.

The retaining means 10a and 10b improve the securing of the elastomeric seal 9 between the seat 1 and the shaft 5. Advantageously, the elastomeric seal 9 is held locally by squeezing between the two retaining means 10a and 10b while preserving a free volume created by the interstices 8a and 8b for the swelling of the elastomeric seal 9. Further advantageously, the configuration of the retaining means 10 in the cavity 8 serves to minimize the leakage rate of the valve.

Figure 4A:
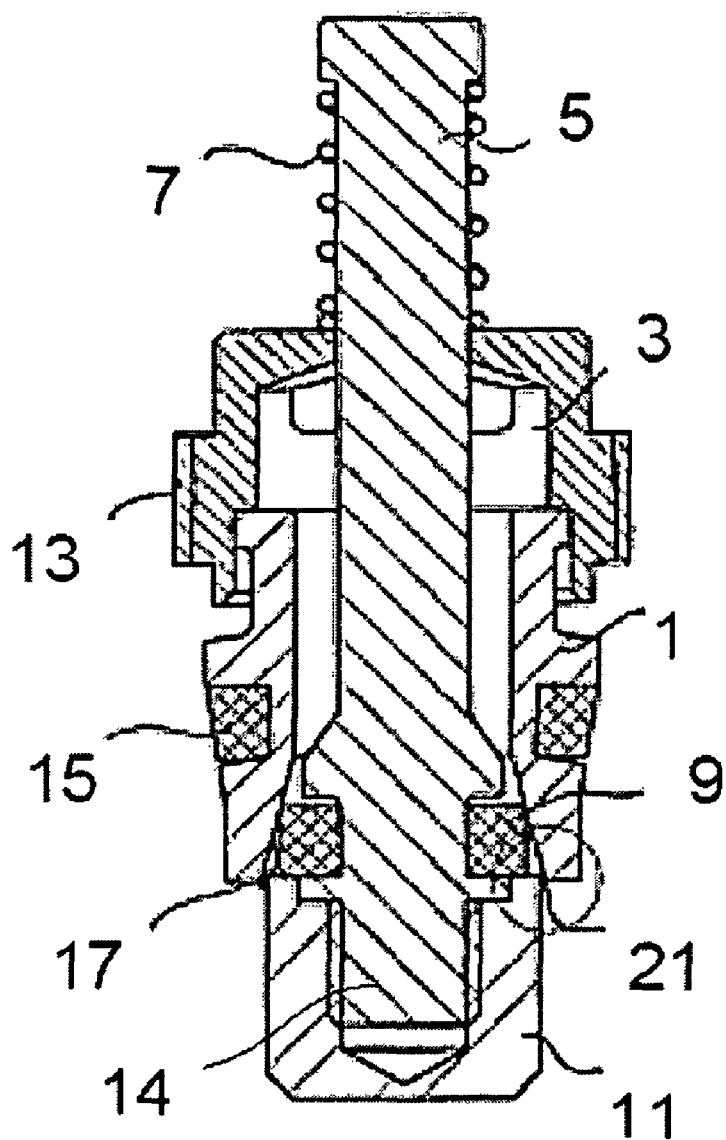
FIG. 4a shows a section of a gas charge valve according to a fourth embodiment of the invention in a high-pressure closed position and in which the thermoplastic seal is provided with a lip.
Figure 4B:
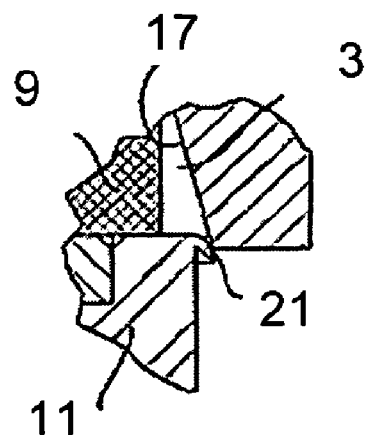

With reference to FIGS. 4a and 4b, they show a fourth embodiment of the mechanism of a gas charge valve according to the present invention in the second closed position, called high-pressure position. In this second position and as shown more clearly in the detail provided in FIG. 4b, the elastomeric seal 9 undergoes an additional compression until the ring forming the thermoplastic seal 11, joined to the shaft 5, comes into leak-free contact against the seat 1 in the passage 3. For this purpose, the thermoplastic seal 11 has a lip 21 to further guarantee this leak-free contact with the seat 1 by deformation of the lip 21, in particular with a frustoconical ring 17 of the passage 3. In the case in which the thermoplastic seal 11 is joined to the seat 1, the lip 21 is deformed to further guarantee the leak-free contact against the shaft 5.

The thermoplastic seal 11 preferably has a cylindrical shape. However, the thermoplastic seal may also have a frustoconical shape to come into leak-free contact with a cylindrical ring of the seat 1 or of the shaft 5. In each of the embodiments of the invention, the contact by deformation of the thermoplastic seal 11 against the seat 1 and the shaft 5, in the passage 3, serves to preserve the sealing of the gas charge valve according to the invention, despite the higher gas pressure, by a movement of the shaft from the low-pressure closed position to the high-pressure closed position against the additional compression of the elastomeric seal 9. The thermoplastic seal 11 on the one hand, the metal seat 1 and the metal shaft 5 on the other, make a "rigid" leak-free contact, unlike the low-pressure closed seal 9, which provides "flexible" sealing. The terms "rigid" and "flexible" mean here that the thermoplastic seal 11 is deformed less than the elastomeric seal 9.

In short, the valve according to the invention is intended to withstand:
  fluids such as $CO_2$ (R744a) (refrigerant gas suitable for replacing the currently used R134a),
  oils,
  pressures up to 200 bar,
  temperatures from −40° C. to +130° C. in continuous operation (150° C. in peaks of 5 minutes)
while having a leakage rate lower than 1 g/year.

For this purpose, elastomers were first selected (seat seal 15 and flap seal 9) to be compatible with $CO_2$ and oils, and to withstand explosive decompression, and with the temperature ranges required. These elastomers have a high hardness to reach the desired leakage rate, lower than 1 g/year.

As to the flexible flap seal 9 (inner elastomeric seal), the contact surface with the cone of the seat 1 has a size such as to perfectly match the conical shape of the seat. Furthermore, the surface finish of the two components in contact must be as smooth as possible (seat cone Ra<or=0.8). The same applies to the groove accommodating the seat seal (15) (Ra<or=0.8). All these features serve to decrease the leakage rate.

In order to reach the target leakage rate of 1 g/year, the seal 9 has been augmented with a deformable thermoplastic polymer 11, which has the function of:

obtaining with the elastomer 9 the high-pressure sealing (second sealing) thanks to the deformation of the polymer against the cone of the seat 1 (passage), protecting the elastomer from direct attack by the fluid, maintaining the elastomer 9 in position.

It is also important to take account of two factors:

the swelling of the seal 9 due to its permeability with regard to the size of the molecules of the fluid used, proper maintenance of the seal during the charging phase.

In fact, if the seal 9 is mounted tightly against the metal shaft and the polymer seal 11, which is mounted on the shaft 5 by various means (screwed, force-fitted, bonded, crimped, etc.), the swelling of the seal 9 will have the effect of:

detaching the polymer seal 11 from the cone of the seat 1 (passage). If this happens, the leakage rate lower than 1 g/year is no longer guaranteed, disengaging the polymer seal 11 from the shaft 5+seal 9 combination and thereby creating a leak and the dislodging of the polymer. In this case, the specification is no longer satisfied.

This is why, in order to deal with this problem, one or two rings are provided to enable the seal 9 to swell in contact with the fluid, but without disengaging the polymer seal 11 from the shaft+seal combination. Thus, the additional volume of the seal 9 is positioned in the hollows of the rings 10a, 10b, thereby preserving a leakage rate lower than 1 g/year.

Furthermore, the ring or rings 10a, 10b allow proper maintenance of the elastomer during charging, when the pressure may reach 70 bar.

Furthermore, in order to obtain a leakage rate lower than 1 g/year, it is imperative:

that there be no particles on the zones providing the seals, to apply the clamping torque recommended between the mechanism and the valve body, so that the seat seal 15 is sufficiently compressed.

In view of the thermodynamic properties of $CO_2$, which imply higher pressures and temperatures than those of R134a (refrigerant gas currently used), the charge valve is designed so that it can withstand these stresses.

In fact, the materials used, and especially the combinations of materials, have been carefully selected in order to obtain a good seal throughout the operating cycle, which implies pressure and temperature stresses.

The ring 11 which is deformed against the metal seat is a member of the thermoplastic polymer family and must preserve all its mechanical properties in the service temperature range, that is between −40° C. and 150° C.

The mechanism according to the invention is simple in its design because it requires no mechanical servicing after the installation of the valve on the nozzle of the air conditioning system used.

The invention claimed is:

1. Charge valve for gas comprising a seat drilled with a passage, a shaft movable inside the passage against the compression of a return spring bearing against the seat, a first elastomeric seal compressed between the seat and the shaft to close the passage when the shaft is moved into a first closed position, called low-pressure position, a second thermoplastic seal that has a hardness higher than that of the first elastomeric seal, compressed between the seat and the shaft to close the passage when the first thermoplastic seal is still compressed between the seat and the shaft and corresponding to a second closed position, called a high-pressure position, wherein the seat has a recess forming a staged double shoulder, having different diameters, in which the first and second seals, having different hardnesses, are separately lodged.

2. Gas charge valve according to claim 1, wherein the thermoplastic seal is provided with projecting retaining means for retaining the elastomeric seal compressed between the seat and the shaft while arranging an interstice between the thermoplastic seal and the elastomeric seal, enabling the elastomeric seal to swell in the presence of the gas.

3. Gas charge valve according to claim 2, wherein the seat is provided with said projecting retaining means for retaining the elastomeric seal compressed between the seat and the shaft while arranging an interstice between the elastomeric seal and one of the seat and the shaft.

4. Gas charge valve according to claim 1, wherein the retaining means consists of a ring.

5. Gas charge valve according to claim 1, wherein the thermoplastic seal is made from polyetheretherketone.

\* \* \* \* \*